United States Patent
Kasamatsu et al.

(10) Patent No.: US 12,235,191 B2
(45) Date of Patent: Feb. 25, 2025

(54) FLIGHT IMAGING SYSTEM AND METHOD

(71) Applicant: FUJIFILM Corporation, Tokyo (JP)

(72) Inventors: Tadashi Kasamatsu, Ashigarakami-gun (JP); Yasukazu Nihei, Ashigarakami-gun (JP); Hiroaki Nakamura, Tokyo (JP); Naoko Yoshida, Ashigarakami-gun (JP); Makoto Yonaha, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 333 days.

(21) Appl. No.: 18/050,833

(22) Filed: Oct. 28, 2022

(65) Prior Publication Data

US 2023/0101728 A1 Mar. 30, 2023

Related U.S. Application Data

(63) Continuation of application No. PCT/JP2021/019701, filed on May 25, 2021.

(30) Foreign Application Priority Data

May 29, 2020 (JP) .................................. 2020-094326

(51) Int. Cl.
G01M 5/00 (2006.01)
B64C 39/02 (2023.01)
(Continued)

(52) U.S. Cl.
CPC ......... *G01M 5/0091* (2013.01); *B64C 39/024* (2013.01); *B64U 20/87* (2023.01);
(Continued)

(58) Field of Classification Search
CPC .................................................... G01S 7/499
See application file for complete search history.

(56) References Cited

U.S. PATENT DOCUMENTS

2005/0110672 A1 5/2005 Cardiasmenos et al.
2008/0195330 A1 8/2008 Hara et al.
(Continued)

FOREIGN PATENT DOCUMENTS

CN 101950436 A * 1/2011 ............. G06T 17/05
CN 102095755 A 6/2011
(Continued)

OTHER PUBLICATIONS

Japanese Office Action for Japanese Application No. 2022-526555, dated Dec. 12, 2023, with English translation.
(Continued)

*Primary Examiner* — Bernarr E Gregory
(74) *Attorney, Agent, or Firm* — Birch, Stewart, Kolasch & Birch, LLP

(57) ABSTRACT

A flight imaging system and a method suitable where an unmanned flying object equipped with a visible camera and millimeter-wave radar is used, and a structure imaged by the visible camera and millimeter-wave radar mounted on the unmanned flying object are provided. A drone constituting the flight imaging system is equipped with a visible camera and a millimeter-wave radar. A processor of the drone performs control of the visible camera to capture a visible image of a surface layer of the structure, and control the millimeter-wave radar to transmit a millimeter wave toward the structure and receive a reflected wave of the millimeter wave from the structure, in a case of imaging the structure. During flight of the drone, the altitude of the drone is measured by an altitude meter mounted on the drone, altitude information indicating the measured altitude is acquired, and is used, in flying the drone.

10 Claims, 13 Drawing Sheets

(51) Int. Cl.
*B64U 20/87* (2023.01)
*B64U 30/20* (2023.01)
*B64U 50/19* (2023.01)
*G01C 5/00* (2006.01)
*G01S 13/86* (2006.01)
*G01S 13/89* (2006.01)
*H04N 23/61* (2023.01)
*B64U 101/30* (2023.01)

(52) U.S. Cl.
CPC .......... *G01C 5/005* (2013.01); *G01M 5/0033* (2013.01); *G01M 5/0075* (2013.01); *G01S 13/86* (2013.01); *G01S 13/867* (2013.01); *G01S 13/89* (2013.01); *B64U 30/20* (2023.01); *B64U 50/19* (2023.01); *B64U 2101/30* (2023.01); *B64U 2201/104* (2023.01); *B64U 2201/20* (2023.01); *H04N 23/61* (2023.01)

(56) References Cited

U.S. PATENT DOCUMENTS

| | | | |
|---|---|---|---|
| 2011/0181881 A1* | 7/2011 | Mathur | G01S 7/499 356/342 |
| 2013/0250070 A1 | 9/2013 | Takayama | |
| 2019/0003830 A1 | 1/2019 | Irie | |
| 2021/0209422 A1 | 7/2021 | Horita | |
| 2021/0405182 A1 | 12/2021 | Reynolds et al. | |

FOREIGN PATENT DOCUMENTS

| | | | | |
|---|---|---|---|---|
| CN | 101614814 B | * | 2/2012 | ............. G01S 17/08 |
| CN | 105068065 A | * | 11/2015 | ............. G01S 7/497 |
| JP | 7-151719 A | | 6/1995 | |
| JP | 11-83754 A | | 3/1999 | |
| JP | 11-83996 A | | 3/1999 | |
| JP | 11-259656 A | | 9/1999 | |
| JP | 2000-193611 A | | 7/2000 | |
| JP | 2002-257744 A | | 9/2002 | |
| JP | 2002-350365 A | | 12/2002 | |
| JP | 2004-212104 A | | 7/2004 | |
| JP | 2004-325246 A | | 11/2004 | |
| JP | 2005-16995 A | | 1/2005 | |
| JP | 2005-37366 A | | 2/2005 | |
| JP | 2006-108473 A | | 4/2006 | |
| JP | 2006-132973 A | | 5/2006 | |
| JP | 2007-121214 A | | 5/2007 | |
| JP | 2007-178384 A | | 7/2007 | |
| JP | 2007-183227 A | | 7/2007 | |
| JP | 2008-145298 A | | 6/2008 | |
| JP | 2008-151809 A | | 7/2008 | |
| JP | 2008-203123 A | | 9/2008 | |
| JP | 2011-39690 A | | 2/2011 | |
| JP | 2011-133322 A | | 7/2011 | |
| JP | 2012-202859 A | | 10/2012 | |
| JP | 2013-250059 A | | 12/2013 | |
| JP | 2014-6222 A | | 1/2014 | |
| JP | 2015-219014 A | | 12/2015 | |
| JP | 2016-6398 A | | 1/2016 | |
| JP | 2016-111414 A | | 6/2016 | |
| JP | 2017-138239 A | | 8/2017 | |
| JP | 2018-54319 A | | 4/2018 | |
| JP | 2018-185228 A | | 11/2018 | |
| JP | 2019-27908 A | | 2/2019 | |
| JP | 2019-39849 A | | 3/2019 | |
| JP | 2019-70627 A | | 5/2019 | |
| JP | 2019-130927 A | | 8/2019 | |
| JP | 2019-144191 A | | 8/2019 | |
| JP | 2019-158793 A | | 9/2019 | |
| JP | 2020-16667 A | | 1/2020 | |
| JP | 2020-24184 A | | 2/2020 | |
| JP | 2020-504811 A | | 2/2020 | |
| JP | 2020-51851 A | | 4/2020 | |
| JP | 2020-63969 A | | 4/2020 | |
| JP | 2020-71863 A | | 5/2020 | |
| KR | 10-1492336 B1 | | 2/2015 | |
| WO | WO 2012/073722 A1 | | 6/2012 | |
| WO | WO 2017/119154 A1 | | 7/2017 | |
| WO | WO 2017/154731 A1 | | 9/2017 | |
| WO | WO 2018/037689 A1 | | 3/2018 | |
| WO | WO 2020/059706 A1 | | 3/2020 | |

OTHER PUBLICATIONS

Japanese Office Action for Japanese Application No. 2022-526554, dated Jan. 24, 2024, with English translation.
International Preliminary Report on Patentability and English translation of the Written Opinion of the International Searching Authority (Forms PCT/IB/326, PCT/IB/373 and PCT/ISA/237) for International Application No. PCT/JP2021/019704, dated Dec. 8, 2022.
International Preliminary Report on Patentability and Written Opinion of the International Searching Authority (Forms PCT/IPEA/409 and PCT/ISA/237) for Application No. PCT/JP2021/019700, dated Jan. 28, 2022, with an English translation.
International Preliminary Report on Patentability and Written Opinion of the International Searching Authority (Forms PCT/IPEA/409 and PCT/ISA/237) for Application No. PCT/JP2021/019703, dated Mar. 4, 2022, with an English translation.
International Preliminary Report on Patentability and Written Opinion of the International Searching Authority (Forms PCT/IPEA/409 and PCT/ISA/237) for International Application No. PCT/ JP2021/019702, dated Apr. 8, 2022, with an English translation.
International Preliminary Report on Patentability and Written Opinion of the International Searching Authority (Forms PCT/IPEA/409 and PCT/ISA/237) for International Application No. PCT/JP2021/019701, Jan. 28, 2022, with an English translation.
International Search Report for International Application No. PCT/JP2021/019702, dated Aug. 17, 2021, with English translation.
International Search Report for International Application No. PCT/JP2021/019704, dated Aug. 3, 2021, with English translation.
International Search Report for International Application No. PCT/JP2021/019700, dated Aug. 17, 2021, with an English translation.
International Search Report for International Application No. PCT/JP2021/019703, dated Aug. 17, 2021, with an English translation.
International Search Report for International Application No. PCT/JP2021/019701, dated Aug. 17, 2021, with English translation.

* cited by examiner

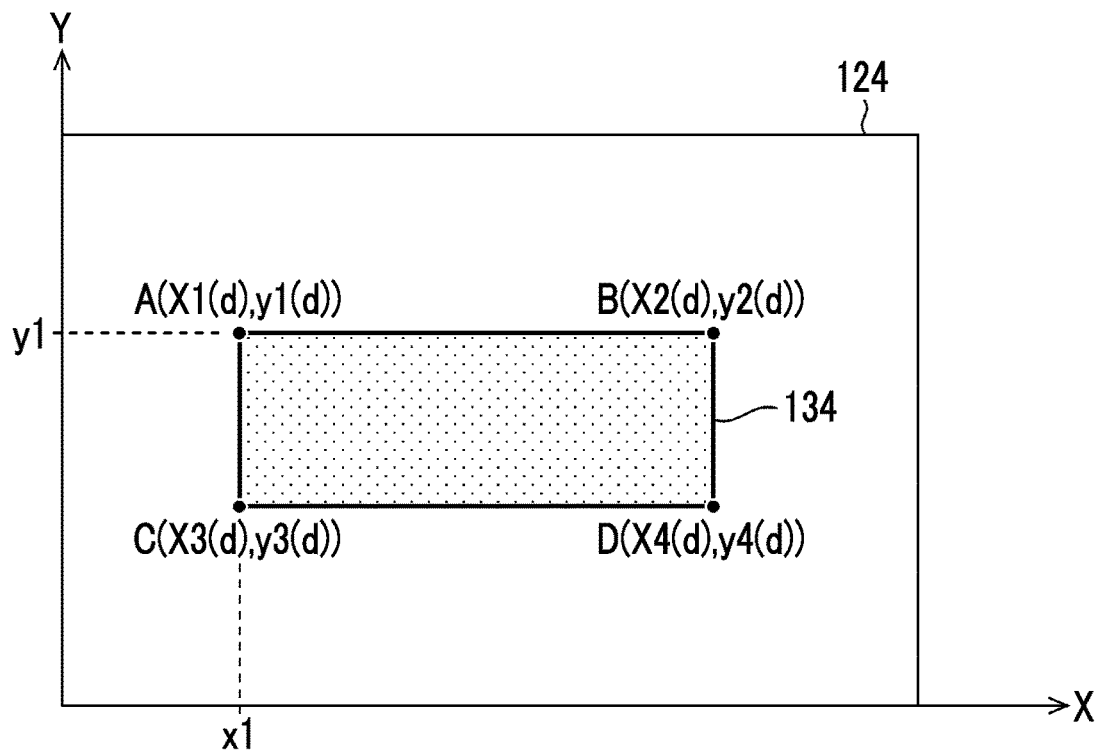

FIG. 7
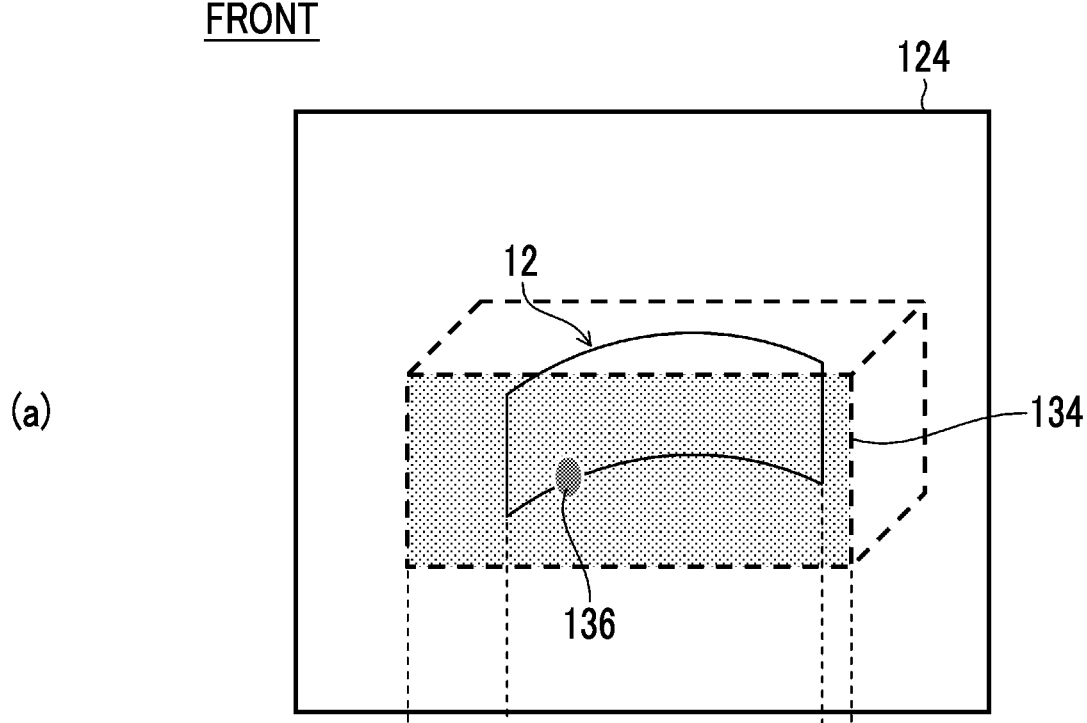
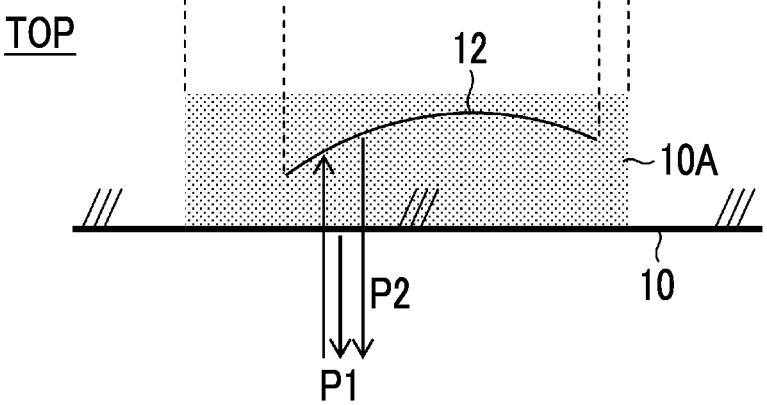

FLIGHT IMAGING SYSTEM AND METHOD

CROSS-REFERENCE TO RELATED APPLICATIONS

The present application is a Continuation of PCT International Application No. PCT/JP2021/019701 filed on May 25, 2021 claiming priority under 35 U.S.C § 119(a) to Japanese Patent Application No. 2020-094326 filed on May 29, 2020. Each of the above applications is hereby expressly incorporated by reference, in its entirety, into the present application.

BACKGROUND OF THE INVENTION

1. Field of the Invention

The present invention relates to a flight imaging system and a method, and particularly to a technology for imaging a structure while flying.

2. Description of the Related Art

In the related art, an imaging system in which a camera mounted on a flight device such as a drone images a vertically long structure (a steel tower, a tower, a high-rise building, or the like) has been proposed (JP2020-71863A).

The imaging system described in JP2020-71863A includes a flight control unit that performs an imaging step of imaging a structure with a camera while the flight device autonomously moves from one side to the other in the vertical direction of the structure. In a case where a height position of the flight device reaches a predetermined position (lower limit position of descent set based on a height position of the peripheral structure), the flight control for limiting the descent is performed.

On the other hand, in JP2007-183227A, a millimeter-wave band electromagnetic wave imaging system that avoids the influence of the uneven structure existing on a surface of the structure as much as possible and allows a deteriorated portion generated in the structure to be seen through with higher accuracy is described.

The electromagnetic wave imaging system described in JP2007-183227A includes an image capturing device that captures an image of a surface of the structure, an electromagnetic wave generating device that irradiates the structure with an electromagnetic wave in a millimeter-wave band, a one-dimensional detector array that detects a reflected wave of the electromagnetic wave in the millimeter-wave band, and a distance sensor that measures a moving distance. The electromagnetic wave imaging system generates a fluoroscopic image of the structure based on the intensity of the reflected wave detected by the one-dimensional detector array and the moving distance measured by the distance sensor.

In particular, in a case where a surface layer cover having unevenness on a surface of a concrete structure is provided, a frequency of the electromagnetic wave in the millimeter-wave band according to the degree of unevenness of the surface layer cover is specified, and the fluoroscopic image of the concrete structure covered with the surface layer cover is generated regardless of the unevenness of the surface layer cover by using the electromagnetic wave in the millimeter-wave band having the specified frequency. The degree of unevenness of the surface layer cover is obtained by analyzing an image of the surface of the structure captured by the image capturing device.

SUMMARY OF THE INVENTION

The imaging system described in JP2020-71863A images a structure with a camera mounted on a flight device, but there is no description of using a millimeter-wave radar for acquiring information on the structure.

In addition, the electromagnetic wave imaging system described in JP2007-183227A acquires information on a structure by using an electromagnetic wave in a millimeter-wave band, but is a handy type device having a size that can be operated with one hand and is a structure and that is moved by hand along the surface of the structure.

The present invention has been made in view of such circumstances, and an object of the present invention is to provide a flight imaging system and a method that are suitable in a case where an unmanned flying object equipped with a visible camera and a millimeter-wave radar is used, and a structure is imaged by a visible camera and a millimeter-wave radar mounted on the unmanned flying object.

In order to achieve the above-described object, a flight imaging system according to a first aspect of the present invention includes a visible camera that captures a visible image, a first millimeter-wave radar, an unmanned flying object equipped with the visible camera and the first millimeter-wave radar, and a processor that controls the visible camera, the first millimeter-wave radar, and the unmanned flying object. The processor performs control of the visible camera to capture a visible image of a surface layer of a structure by the visible camera, and control of the first millimeter-wave radar to transmit a millimeter wave toward the structure from the first millimeter-wave radar and receive a reflected wave of the millimeter wave from the structure, in a case of imaging the structure, and processing of measuring an altitude of the unmanned flying object from a reference surface by an altitude meter mounted on the unmanned flying object and of acquiring altitude information indicating the measured altitude, during flight of the unmanned flying object, and the altitude information is used in a case of flying the unmanned flying object.

According to the first aspect of the present invention, in a case of imaging the structure, by using the unmanned flying object equipped with the visible camera and the first millimeter-wave radar, it is possible to acquire a visible image of the structure by the visible camera mounted on the unmanned flying object and information about the structure by the first millimeter-wave radar. In addition, during flight of the unmanned flying object, it is possible to measure an altitude of the unmanned flying object from a reference surface by an altitude meter mounted on the unmanned flying object, and use the altitude for flight control of the unmanned flying object.

In the flight imaging system according to a second aspect of the present invention, it is preferable that the altitude meter is a laser distance meter. This is because the laser distance meter has higher measurement accuracy than the millimeter-wave radar.

In the flight imaging system according to a third aspect of the present invention, it is preferable that the laser distance meter further measures a distance from the unmanned flying object to the structure. The measured distance can be used in a case where the unmanned flying object is positioned at a desired distance (imaging distance) with respect to the structure.

In the flight imaging system according to a fourth aspect of the present invention, the flight imaging system further includes a reference surface detecting unit that detects whether or not the reference surface is a reference surface that is difficult to detect with the laser distance meter. The laser distance meter measures, in a case where the reference surface is a surface that is difficult to detect with the laser distance meter, the altitude of the unmanned flying object by newly setting a new reference surface that is capable of being detected by the laser distance meter as the reference surface.

In the flight imaging system according to a fifth aspect of the present invention, the reference surface that is difficult to detect is a water surface.

In the flight imaging system according to a sixth aspect of the present invention, the new reference surface is a ground existing in a direction except for a vertical downward direction of the unmanned flying object.

In the flight imaging system according to a seventh aspect of the present invention, the reference surface detecting unit is a second millimeter-wave radar.

In the flight imaging system according to an eighth aspect of the present invention, the first millimeter-wave radar is also used as the second millimeter-wave radar, and the processor directs the first millimeter-wave radar toward the structure in a case of imaging the structure, and directs the first millimeter-wave radar downward during the flight of the unmanned flying object.

In the flight imaging system according to a ninth aspect of the present invention, in a case of imaging the structure, the processor performs millimeter-wave image generation processing of generating a millimeter-wave image showing an inside of the structure based on the reflected wave of the millimeter wave from the structure received by the first millimeter-wave radar.

In a flight imaging system according to a tenth aspect of the present invention, the flight imaging system further includes a memory that stores a relationship between a first imaging range of the visible image of the surface layer of the structure captured by the visible camera and a second imaging range of the generated millimeter-wave image. The processor performs combination processing of combining the millimeter-wave image with the visible image based on the relationship between the first imaging range and the second imaging range stored in the memory.

In the flight imaging system according to an eleventh aspect of the present invention, the structure is a concrete structure, and the millimeter-wave image is an image showing an internal defect of the concrete structure.

The invention according to a twelfth aspect is a flight imaging method of causing a processor to control imaging and flight by an unmanned flying object equipped with a visible camera and a first millimeter-wave radar, the method including causing the processor to execute: a step of capturing a visible image of a surface layer of a structure by the visible camera, and a step of transmitting a millimeter wave toward the structure from the first millimeter-wave radar and receiving a reflected wave of the millimeter wave from the structure, in a case of imaging the structure; and a step of measuring an altitude of the unmanned flying object from a reference surface by an altitude meter mounted on the unmanned flying object and acquiring altitude information indicating the measured altitude, during flight of the unmanned flying object. The altitude information is used in a case of flying the unmanned flying object.

According to the present invention, in a case of imaging the structure, by using the unmanned flying object equipped with the visible camera and the first millimeter-wave radar, it is possible to acquire a visible image of the structure by the visible camera mounted on the unmanned flying object and information about the structure by the first millimeter-wave radar. In addition, during flight of the unmanned flying object, it is possible to measure an altitude of the unmanned flying object from a reference surface by an altitude meter mounted on the unmanned flying object, and use the altitude for flight control of the unmanned flying object.

BRIEF DESCRIPTION OF THE DRAWINGS

FIG. 4 is a diagram showing a relationship between a visible image and a millimeter-wave image.

FIG. 5 is a table showing a relationship between a plurality of distances and coordinates of four points of a millimeter-wave image at each distance.

FIG. 7 is a diagram showing a relationship between a visible image and a millimeter-wave image showing an internal defect.

DESCRIPTION OF THE PREFERRED EMBODIMENTS

Hereinafter, a preferable embodiment of a flight imaging system and a method according to an embodiment of the present invention will be described in accordance with appended drawings.

[Outline of Present Invention]

Figure 1:
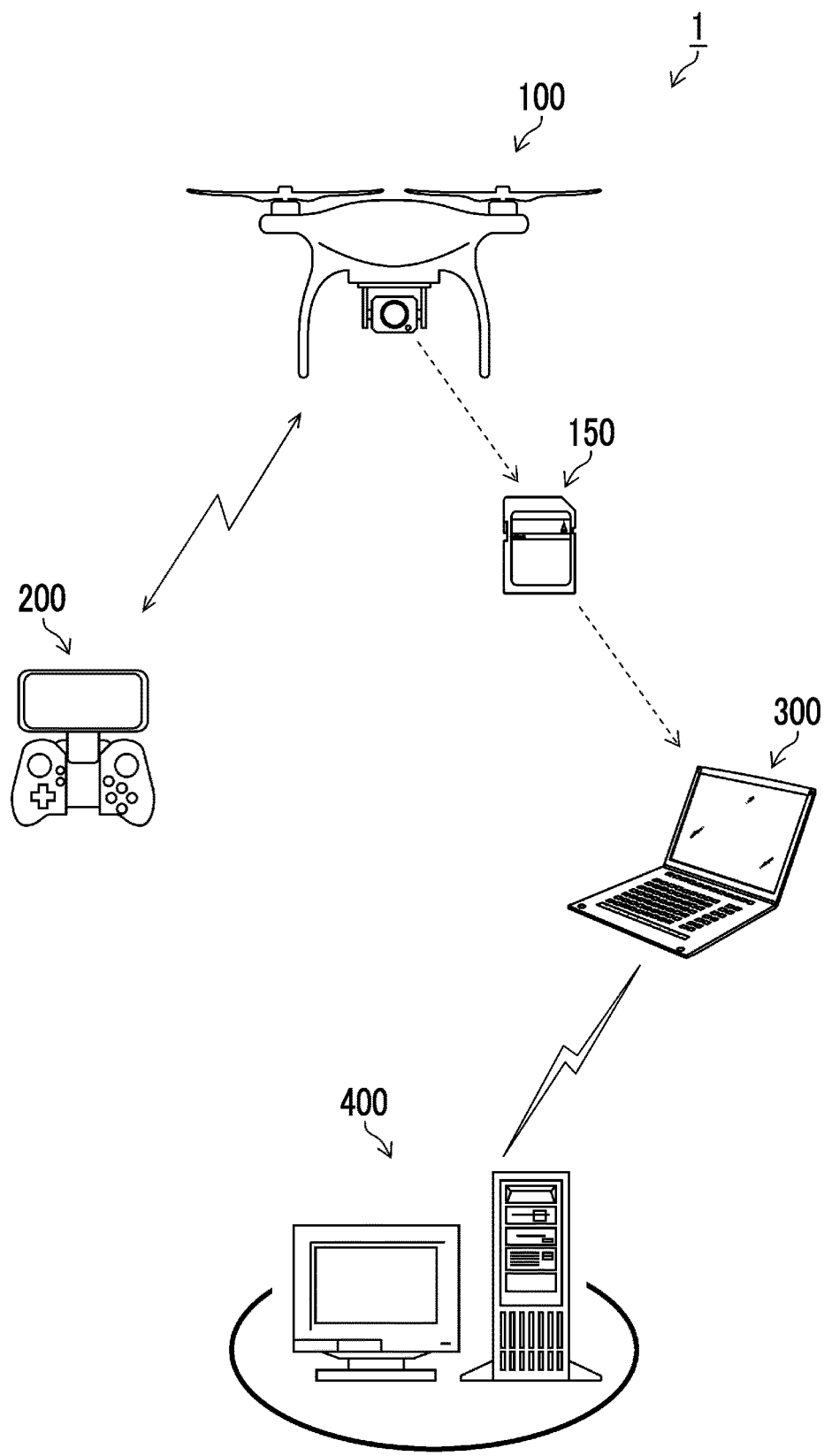
FIG. 1 is a diagram showing a schematic configuration of a flight imaging system according to the present invention.

FIG. 1 is a diagram showing a schematic configuration of a flight imaging system according to the present invention.

The flight imaging system 1 shown in FIG. 1 includes a drone 100 which is an unmanned flying object, a remote controller 200, a user terminal 300, and a server 400. The user terminal 300 may be a personal computer (PC) (laptop PC, tablet PC), a smartphone, or the like that can communicate with the server 400.

Figure 2:
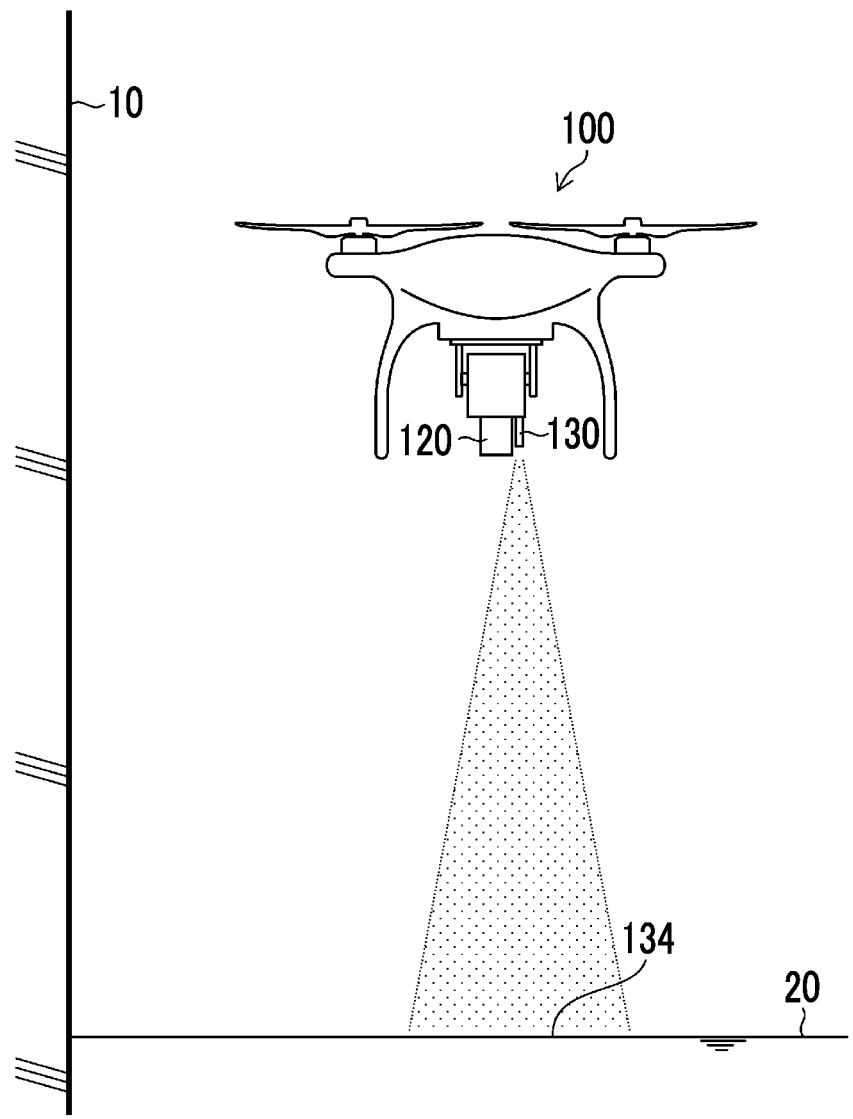
FIG. 2 is a diagram showing an outline of a first embodiment of the flight imaging system according to the present invention, and is a diagram showing a state of a drone during flight.
Figure 3:
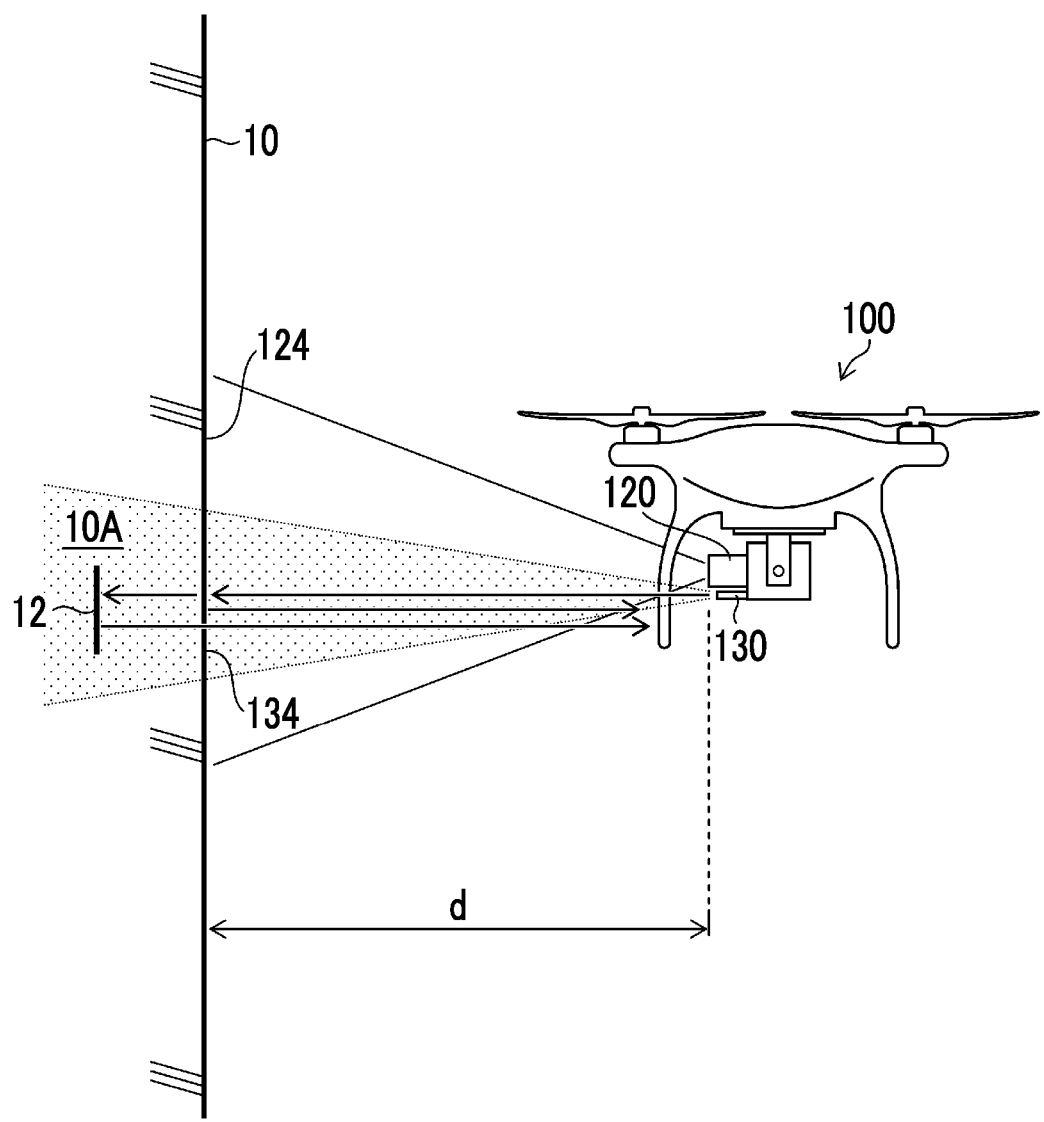
FIG. 3 is a diagram showing an outline of the first embodiment of the flight imaging system according to the present invention, and is a diagram showing a state of the drone at the time of imaging.

FIG. 2 is a diagram showing a state of the drone during flight, and FIG. 3 is a diagram showing a state of the drone at the time of imaging the structure with a visible camera or the like mounted on the drone. As shown in FIGS. 2 and 3, a visible camera 120 and a millimeter-wave radar (first millimeter-wave radar) 130 are mounted on the drone 100.

The flight imaging system 1 sequentially moves to each imaging point with the drone 100, images the structure with the visible camera 120 at each imaging point, and acquires a visible image of the surface layer of the structure. In addition, in order to acquire a millimeter-wave image corresponding to the visible image, the flight imaging system 1 transmits a millimeter wave toward the structure at each imaging point from the millimeter-wave radar 130, and receives the reflected wave of the millimeter wave from the structure.

The reflected wave of the millimeter wave from the structure is reflected by the surface of the structure, but a part of the reflected wave reaches a certain distance (for example, several centimeters) from the surface of the structure, so that the millimeter-wave reception data received from millimeter-wave area includes three-dimensional information up to the certain distance from the surface of the structure. In this example, acquiring the millimeter-wave reception data is also referred to as imaging a millimeter-wave image by the millimeter-wave radar.

The structures 10 shown in FIGS. 2 and 3 are social infrastructure structures such as bridges and tunnels, and buildings.

For example, the drone 100 autonomously flies along a predetermined flight route, or semi-autonomously flies in response to an instruction from the remote controller 200. It is preferable that the flight route is designed so as to connect each imaging point of the structure with the shortest route.

The visible image and the millimeter-wave image captured at each imaging point are transmitted from the drone 100 to the server 400 via the user terminal 300 after the imaging at all the imaging points is completed. The data of the visible image and the millimeter-wave image is transferred from the drone 100 to the user terminal 300 by a memory card 150 in which the visible image and the millimeter-wave image are recorded, or by connecting the drone 100 and the user terminal 300 via a universal serial bus (USB) cable or short-range wireless connection.

First Embodiment

FIGS. 2 and 3 are diagrams showing an outline of a first embodiment of the flight imaging system according to the present invention, FIG. 2 shows a state of the drone at the time of flight, and FIG. 3 is a state of the drone at the time of imaging.

[At the Time of Flight]

The millimeter-wave radar 130 shown in FIG. 2 is configured such that the entire or a part (for example, a transmission/reception module) of the millimeter-wave radar 130 can be rotated (tilted) with respect to the drone 100.

During the flight of the drone 100, the millimeter-wave radar 130 is directed downward. That is, in the millimeter-wave radar 130, the rotation angle of the millimeter-wave radar 130 is controlled such that the transmission/reception direction of the millimeter wave from the millimeter-wave radar 130 is the downward direction of the drone 100.

In this example, the visible camera 120 and the millimeter-wave radar 130 are integrated and the rotation angle is controlled at the same time. However, the rotation angle may be individually controlled. In addition, "at the time of flight" or "during flight" of the drone 100 includes flight in a case where the drone 100 is moving in the air and stationary flight (hovering) in which the drone 100 is stationary in the air.

As the millimeter-wave radar 130, for example, various methods such as a beam switching method, a phased array method, and a digital beam forming method can be applied.

The beam switching method is a method of forming a plurality of fixed beams having a narrow beam width in which the oriented directions are slightly different from each other and electrically switching the fixed beams by time division.

The phased array method uses a phased array antenna in which a plurality of element antennas are arranged at regular intervals, and controls the phase of a signal by a phase controller connected to the plurality of element antennas to form and emit a beam in a high frequency band.

Similar to the phased array method, the digital beam forming method uses a phased array antenna, detects signals received by a plurality of element antennas in the reception, converts the signal into a baseband signal, converts the signal into a digital signal, and then forms a beam by a signal processing operation. In this method, since the waveform information of the received signal is stored as numerical data, it is possible to form a beam or the like having various characteristics and shapes by operation.

In the millimeter-wave radar 130, in a case where the transmission/reception direction of the millimeter wave from the millimeter-wave radar 130 is controlled to be downward direction of the drone 100, a distance in the millimeter-wave area (area where the millimeter wave is transmitted and received) 134 on a reference surface 20 of the ground or the water surface can be measured. The shortest distance among the distances measured in the millimeter-wave area 134 is the height (altitude) from the reference surface 20 of the drone 100.

In the first embodiment of the flight imaging system according to the present invention, the millimeter-wave radar 130 during flight of the drone 100 functions as an altitude meter and measures the altitude of the drone 100. The altitude information indicating the measured altitude is used as information in a case where the drone 100 is made to fly (autonomous flight or semi-autonomous flight).

In general, a drone is equipped with a global positioning system (GPS) module, and the GPS module receives GPS signals transmitted from a plurality of GPS satellites, performs positioning calculation processing based on the received plurality of GPS signals, and detects position information including a latitude, a longitude, and an altitude of the GPS module.

However, the GPS module has a drawback that it cannot acquire the position information (altitude information) in a place where the GPS signal cannot be received, such as in a tunnel or under a bridge.

On the other hand, according to the millimeter-wave radar 130 mounted on the drone 100, the altitude of the drone 100 can be measured under any environment, and the measured altitude can be used for autonomous flight of the drone 100 or the like.

[At the Time of Imaging]

The visible camera 120 is configured such that the entire or a part of the visible camera 120 (for example, an imaging unit including a lens and an image sensor) can be rotated (tilted) with respect to the drone 100.

As shown in FIG. 3, at the time of imaging with the drone 100, the drone 100 transitions to hovering stationary in the air. During hovering, the position and the posture of the drone 100 are controlled to be maintained based on the sensor output of the gyro sensor, the acceleration sensor, or the like mounted on the drone 100. While the drone 100 is stationary, the altitude of the drone 100 is controlled to be a desired altitude based on the altitude information measured by the millimeter-wave radar 130.

In addition, while the drone 100 is stationary, the rotation angle of the visible camera 120 is controlled such that the imaging direction of the visible camera 120 is the direction of the structure 10. Similarly, the rotation angle of the millimeter-wave radar 130 is controlled such that the transmission/reception direction of the millimeter wave from the millimeter-wave radar 130 is the direction of the structure 10.

In this case, it is preferable that the visible camera 120 and the millimeter-wave radar 130 are rotationally controlled so as to face the structure 10.

After that, in a case where the drone 100 receives the imaging instruction from the remote controller 200 by a user operation or in a state in which the drone 100 is stationary and ready to image, the drone 100 automatically causes the visible camera 120 to capture a visible image of the surface layer of the structure 10, or transmits the millimeter wave toward the structure 10 from the millimeter-wave radar 130, receives the reflected wave of the millimeter wave from the structure 10, and acquires the millimeter-wave reception data.

<Relationship between Visible Image and Millimeter-Wave Image>

FIG. 4 is a diagram showing a relationship between a visible image and a millimeter-wave image.

In FIG. 4, 124 indicates a first imaging range (visible image area) 124 corresponding to a visible image, and 134 indicates a second imaging range (millimeter-wave area) corresponding to a millimeter-wave image.

As shown in FIG. 4, in an xy coordinate system (the coordinate system of the image sensor of the visible camera 120) that specifies the visible image area 124, the coordinates of the four points A, B, C, and D of the millimeter-wave area 134 (A(x1(d), y1(d)), B(x2(d), y2(d)), C(x3(d), y3(d)), D(x4(d), y4(d))) are obtained in advance. For example, at a factory, it is measured in advance which positions in the visible image correspond to the four points of the millimeter-wave image at a certain distance d. An aluminum metal plate that strongly reflects the millimeter wave is disposed in the imaging area of the visible image, the reflection intensity of the millimeter wave is observed while shifting the aluminum metal plate, and the millimeter-wave area 134 is fixed based on the position in the visible image area 124 of the aluminum metal plate, at which the reflected wave of the millimeter wave cannot be detected first.

Then, the distance d is changed, and the coordinates of the four points A, B, C, and D of the millimeter-wave area 134 are obtained for each of the plurality of distances (d1, d2, d3, . . . ).

FIG. 5 is a table showing a relationship between a plurality of distances and coordinates of four points of a millimeter-wave image at each distance.

During operation, the distance d between the drone 100 and the structure 10 is measured, and a table shown in FIG. 5 is used to estimate which pixel positions in the visible image are the four points A, B, C, and D of the millimeter-wave area 134. In a case where the measured distance d does not exist in the table, the pixel positions of the four points A, B, C, and D corresponding to the distances before and after the measured distance d are linearly interpolated.

In a case where the structure 10 is a concrete structure and there are internal defects 12 such as fissuring generated inside the structure 10 or floating of concrete, the millimeter-wave radar 130 can also receive reflected waves reflected by the internal defects 12. In addition, in a case where the outer wall tile is attached to the structure 10, the millimeter-wave radar 130 can receive the reflected wave reflected by defects such as floating of the outer wall tile.

Figure 6:
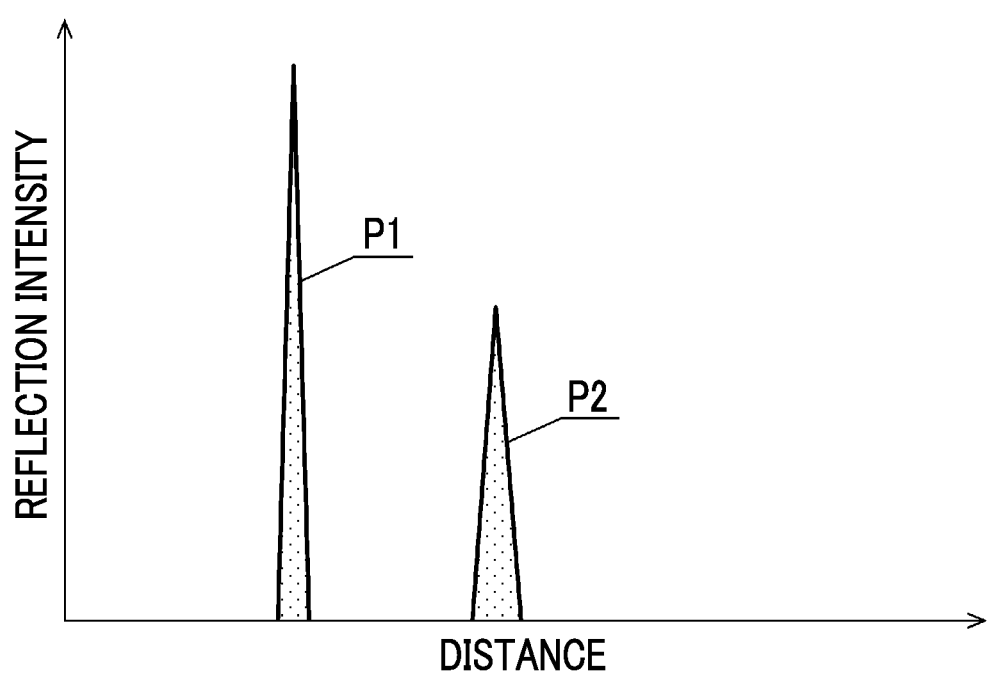
FIG. 6 is a diagram schematically showing a relationship between a reflection intensity of a millimeter wave and a distance at a certain pixel position of the millimeter-wave image.

FIG. 6 is a diagram schematically showing a relationship between a reflection intensity of a millimeter wave and a distance at a certain pixel position of the millimeter-wave image.

In FIG. 6, P1 indicates a reflected wave from the surface of the structure 10, and P2 indicates a reflected wave from the internal defect 12 of the structure 10.

The distance between the reflected waves P1 and P2 corresponds to a depth of the internal defect 12.

FIG. 7 is a diagram showing a relationship between a visible image and a millimeter-wave image showing an internal defect.

(A) of FIG. 7 is a front view in a case where the visible image and the millimeter-wave image are superimposed, and (B) of FIG. 7 is a perspective view of the structure 10 which is an image target of the visible image and the millimeter-wave image viewed from above.

In (B) of FIG. 7, in a case where a millimeter wave T is emitted from the millimeter-wave radar 130 to a certain position of the structure 10, a reflected wave P1 from the surface of the structure 10 and a reflected wave P2 from the internal defect 12 which is present an inside detection area 10A of the structure 10 are can be detected. The reflection intensities and distances of the reflected waves P1 and P2 are as shown in FIG. 5.

Therefore, in a case where the millimeter-wave image is generated based on the reflected wave P2 from the internal defect 12, the millimeter-wave image becomes an image showing the internal defect 12. In addition, since the positional relationship between the visible image and the millimeter-wave image can be specified based on the table shown in FIG. 6, the millimeter-wave image can be combined with the visible image.

In (A) of FIG. 7, 136 represents a certain pixel of the millimeter-wave image. In addition, it is preferable that the millimeter-wave image has a color different from that of the visible image such as red, and is represented by a shade according to the depth and the reflection intensity so that the millimeter-wave image can be distinguished from the visible image of the surface layer of the structure 10.

Returning to FIG. 3, the millimeter-wave radar 130 can measure the distance d between the drone 100 and the structure 10 at the time of imaging.

The distance d measured by the millimeter-wave radar 130 can be used in a case of reading out the coordinates of the four points A, B, C, and D of the millimeter-wave area 134 from the table shown in FIG. 5. In addition, the distance d can be used to control the position of the imaging point of the drone 100 in a case where the imaging distance from the drone 100 to the structure 10 is maintained at a desired imaging distance, and further, the imaging lens of the visible camera 120 can be used for focusing.

In this way, in a case where the drone 100 captures the visible image and the millimeter-wave image at a certain imaging point, the drone 100 flies to the next imaging point and captures the visible image and the millimeter-wave image. This is repeated until the imaging of the visible image and the millimeter-wave image at all the imaging points of the structure 10 is completed.

Second Embodiment

Figure 8:
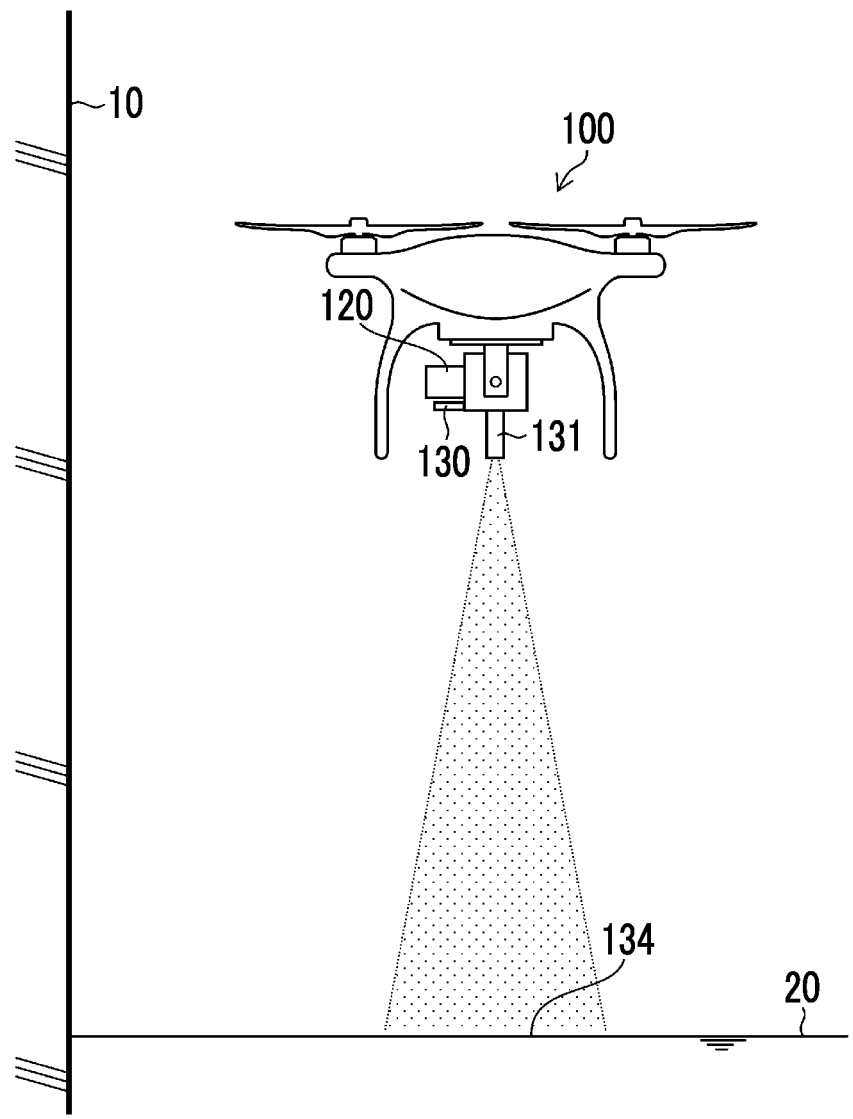
FIG. 8 is a diagram showing an outline of a second embodiment of the flight imaging system according to the present invention.

FIG. 8 is a diagram showing an outline of a second embodiment of the flight imaging system according to the present invention. Components shown in FIG. 8 common to the flight imaging system according to the first embodiment shown in FIG. 2 or the like will be denoted by the same reference numerals as those shown in FIG. 2 or the like, and the detailed description thereof will be omitted.

The flight imaging system of the second embodiment shown in FIG. 8 is different from the flight imaging system of the first embodiment shown in FIG. 2 or the like in that a millimeter-wave radar 131 is added.

That is, the millimeter-wave radar (first millimeter-wave radar) 130 is directed toward the structure 10 and is used for capturing a millimeter-wave image of the structure 10. The millimeter-wave radar (second millimeter-wave radar) 131 is directed downward of the drone 100, and functions as an altitude meter that measures the altitude of the drone 100.

Other configurations and functions of the flight imaging system according to the second embodiment are common to the flight imaging system according to the first embodiment shown in FIGS. 2 to 7.

Third Embodiment

Figure 9:
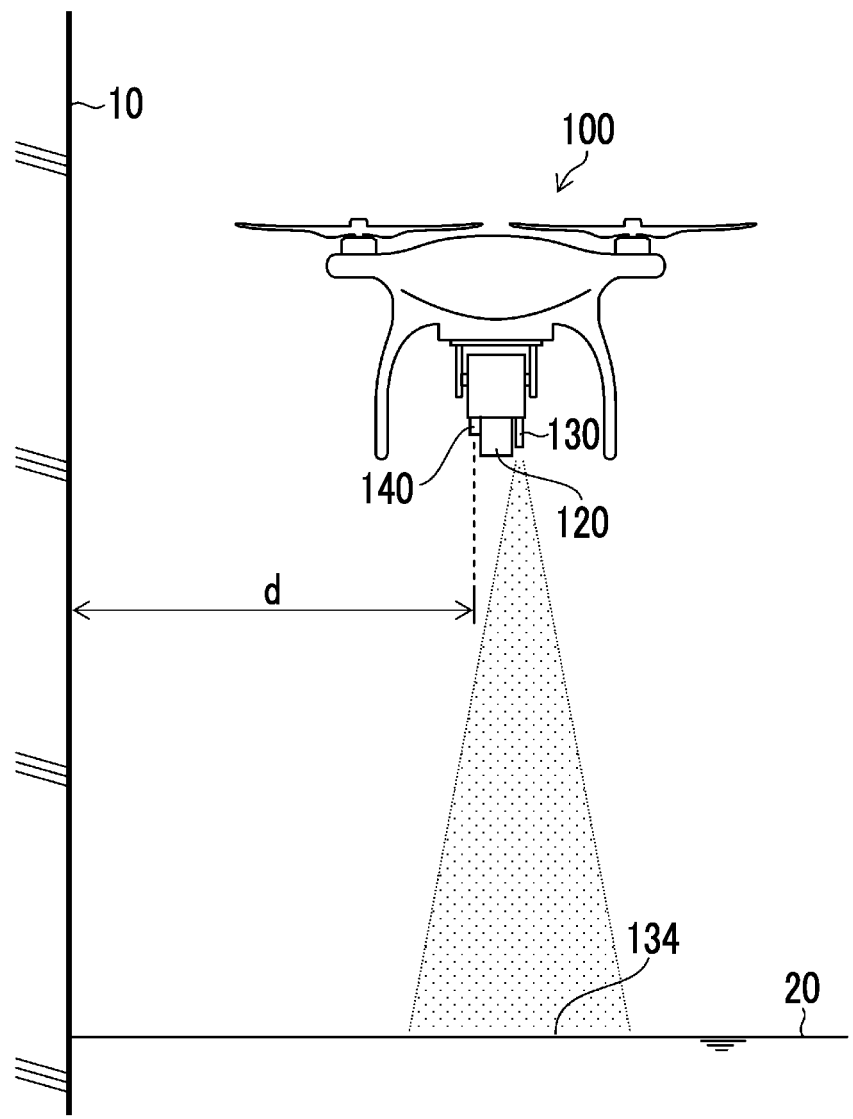
FIG. 9 is a diagram showing an outline of a third embodiment of the flight imaging system according to the present invention, and is a diagram showing a state of a drone at the time of flight.
Figure 10:
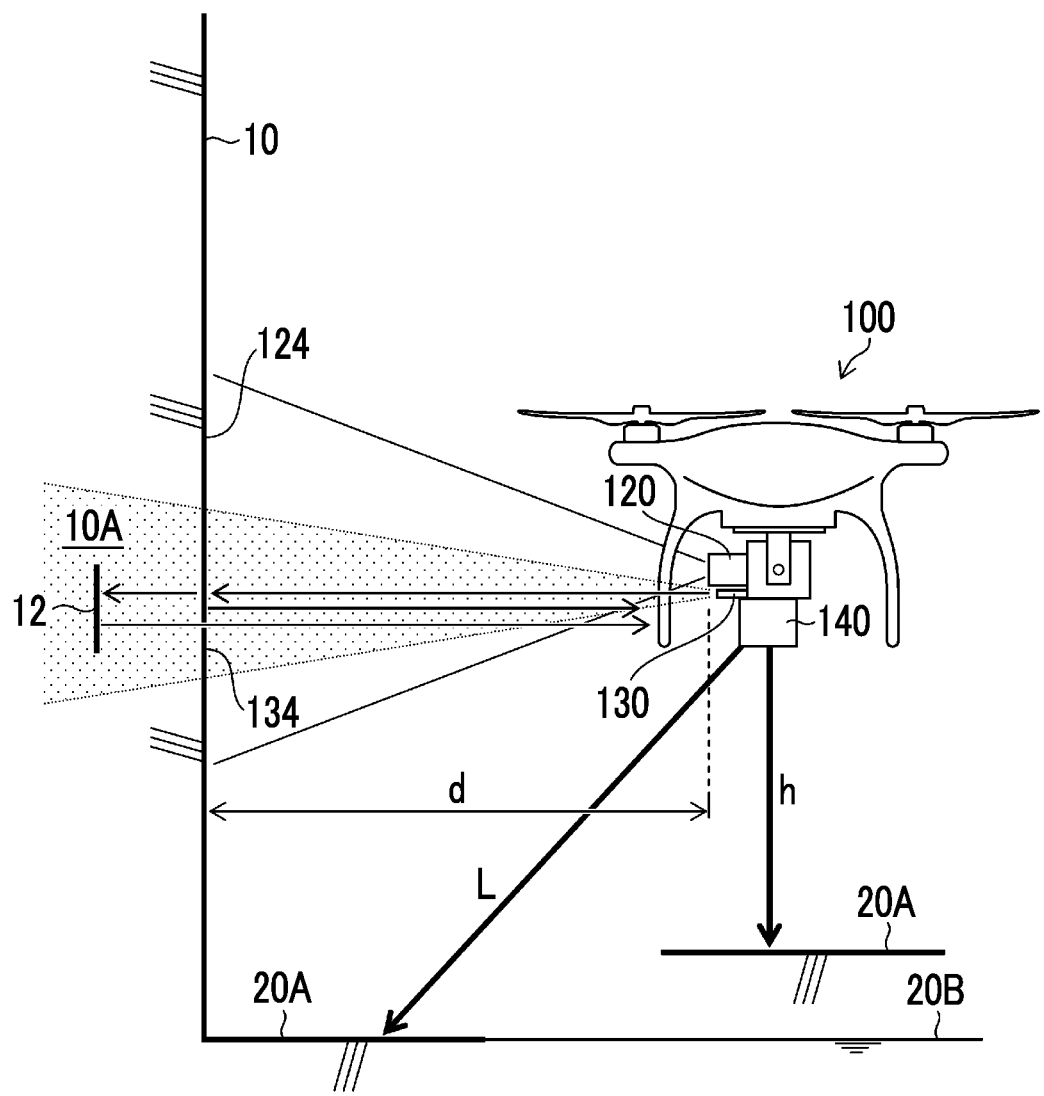
FIG. 10 is a diagram showing an outline of the third embodiment of the flight imaging system according to the present invention, and is a diagram showing a state of the drone at the time of imaging.

FIGS. 9 and 10 are diagrams showing an outline of a third embodiment of the flight imaging system according to the present invention, FIG. 9 shows a state of the drone at the time of flight, and FIG. 10 is a state of the drone at the time of imaging. Components shown in FIGS. 9 and 10 common to the flight imaging system according to the first embodiment shown in FIG. 2 or the like will be denoted by the same reference numerals as those shown in FIG. 2 or the like, and the detailed description thereof will be omitted.

The flight imaging system of the third embodiment shown in FIGS. 9 and 10 is different from the flight imaging system of the first embodiment shown in FIG. 2 or the like in that a laser distance meter 140 is added.

[At the Time of Flight]

The millimeter-wave radar 130 shown in FIG. 9 measures the altitude of the drone 100, and during flight of the drone 100, the millimeter-wave radar 130 is directed downward as in the first embodiment.

The millimeter-wave radar 130 has lower accuracy in measuring the distance than the laser distance meter 140, but can measure the distance (altitude) to such an extent that the flight of the drone 100 is not hindered. In particular, it is advantageous as compared with the laser distance meter 140 in that the altitude can be measured even in a case where the reference surface 20 is a water surface.

In addition, the millimeter-wave radar 130 is also used as a reference surface detecting unit that detects whether or not the reference surface 20 that is a reference for measuring the altitude of the drone 100 is a reference surface that is difficult to detect with the laser distance meter 140. Here, the surface that is difficult to detect with the laser distance meter 140 is the water surface.

As will be described later with reference to FIG. 10, an altitude h of the drone 100 at the time of stationary flight of the drone 100 is measured by the laser distance meter 140. This is because the laser distance meter 140 can measure the distance (altitude) more accurately than the millimeter-wave radar 130.

In a case where the millimeter-wave radar 130 detects that the reference surface in the vertical downward direction of the drone 100 is a surface (water surface) that is difficult to detect with the laser distance meter 140, a new reference surface (ground) that is newly set and can be detected by the laser distance meter 140 is used as the reference surface for altitude measurement of the drone 100.

The millimeter-wave radar 130 measures the altitude of the drone 100 during the moving flight of the drone 100, and in a case where the drone 100 is stationary in the air, discriminates between a ground area and a water surface area in the millimeter-wave area.

In a case where the drone 100 is stationary, the intensity of the reflected wave from the water surface area changes with time due to the influence of the wave on the water surface, whereas the intensity of the reflected wave from the ground area hardly changes with time.

Accordingly, by analyzing the reflected wave obtained from the millimeter-wave radar 130 before the drone 100 is stationary in the air and switches the direction of the millimeter-wave radar 130 for imaging the structure 10, the ground and the water surface area in the millimeter-wave area can be discriminated.

The laser distance meter 140 measures the distance to the measurement target by measuring the time during which the emitted laser light is reflected by the measurement target and received the light, and it is preferable to use light detection and ranging (LiDAR). LiDAR is used in an automatic operation system, and can measure a position and a shape of an object in space in addition to a distance to the object.

The laser distance meter 140 detects an obstacle on the flight route at the time of the moving flight of the drone 100, or measures the distance d from the drone 100 to the structure 10. The information of the object measured by the laser distance meter 140 is used in a case where the drone 100 is made to fly autonomously or semi-autonomously. For example, the information can be used for autonomous flight of the drone 100 such that the distance d between the drone 100 and the structure 10 is maintained at a desired distance.

[At the Time of Imaging]

As shown in FIG. 10, at the time of imaging with the drone 100, the drone 100 transitions to hovering stationary in the air.

In a case where the drone 100 is stationary, as described above, before switching the direction of the millimeter-wave radar 130 for imaging the structure 10, the reflected wave obtained from the millimeter-wave radar 130 is analyzed, and the ground area and the water surface area in the millimeter-wave area in the downward direction of the drone 100 are discriminated.

In a case where the area in the vertical downward direction of the drone 100 is discriminated to be the ground area, the ground corresponding to the ground area is set as the reference surface 20A, and the distance to the reference surface 20A is measured by the laser distance meter 140. Then, the drone 100 acquires the shortest distance among the distances measured by the laser distance meter 140 as the altitude h (h1) of the drone 100.

In a case where an area in the vertical downward direction of the drone 100 is discriminated to be the water surface area, a new reference surface 20A (a reference surface of the ground corresponding to the ground area other than the vertical downward direction) that can be detected by the laser distance meter 140 is set instead of the reference surface 20B corresponding to the water surface area, and the distance L between the drone 100 and the new reference surface 20A is measured by the laser distance meter 140.

Then, based on the angle θ formed between the measured distance L and the vertical downward direction of the laser light at the time of measuring the distance L, the altitude h (h2) of the drone 100 is calculated by the following equation.

$$h2 = L \times \cos\theta \qquad \text{[Equation 1]}$$

The altitude information of the drone 100 measured by the laser distance meter 140 can be used for controlling the altitude of the drone 100 in a stationary state in a case where an imaging point (at least an altitude) of the drone 100 is set.

After that, the rotation angle of the visible camera 120 is controlled such that the imaging direction of the visible camera 120 becomes the direction of the structure 10, as in the first embodiment shown in FIG. 2 or the like. Similarly, the rotation angle of the millimeter-wave radar 130 is controlled such that the transmission/reception direction of the millimeter wave from the millimeter-wave radar 130 is the direction of the structure 10.

The drone 100 automatically captures a visible image of the surface layer of the structure 10 by the visible camera 120 in a case of receiving an imaging instruction from the remote controller 200 by a user operation or in a state in which the drone 100 is stationary and capable of imaging. In addition, a millimeter-wave image is imaged by the millimeter-wave radar 130.

In addition, at the time of capturing the visible image and the millimeter-wave image, the distance d between the drone 100 (the visible camera 120 and the millimeter-wave radar 130) and the structure 10 is measured by the laser distance meter 140. The distance d measured by the laser distance meter 140 can be used in a case of reading out the coordinates of the four points A, B, C, and D of the millimeter-wave area 134 from the table shown in FIG. 5. In addition, the distance d can be used to control the position of the imaging point of the drone 100 in a case where the imaging distance from the drone 100 to the structure 10 is maintained at a desired imaging distance, and further, the imaging lens of the visible camera 120 can be used for focusing.

[Hardware Configuration of Flight Imaging System]

Figure 11:
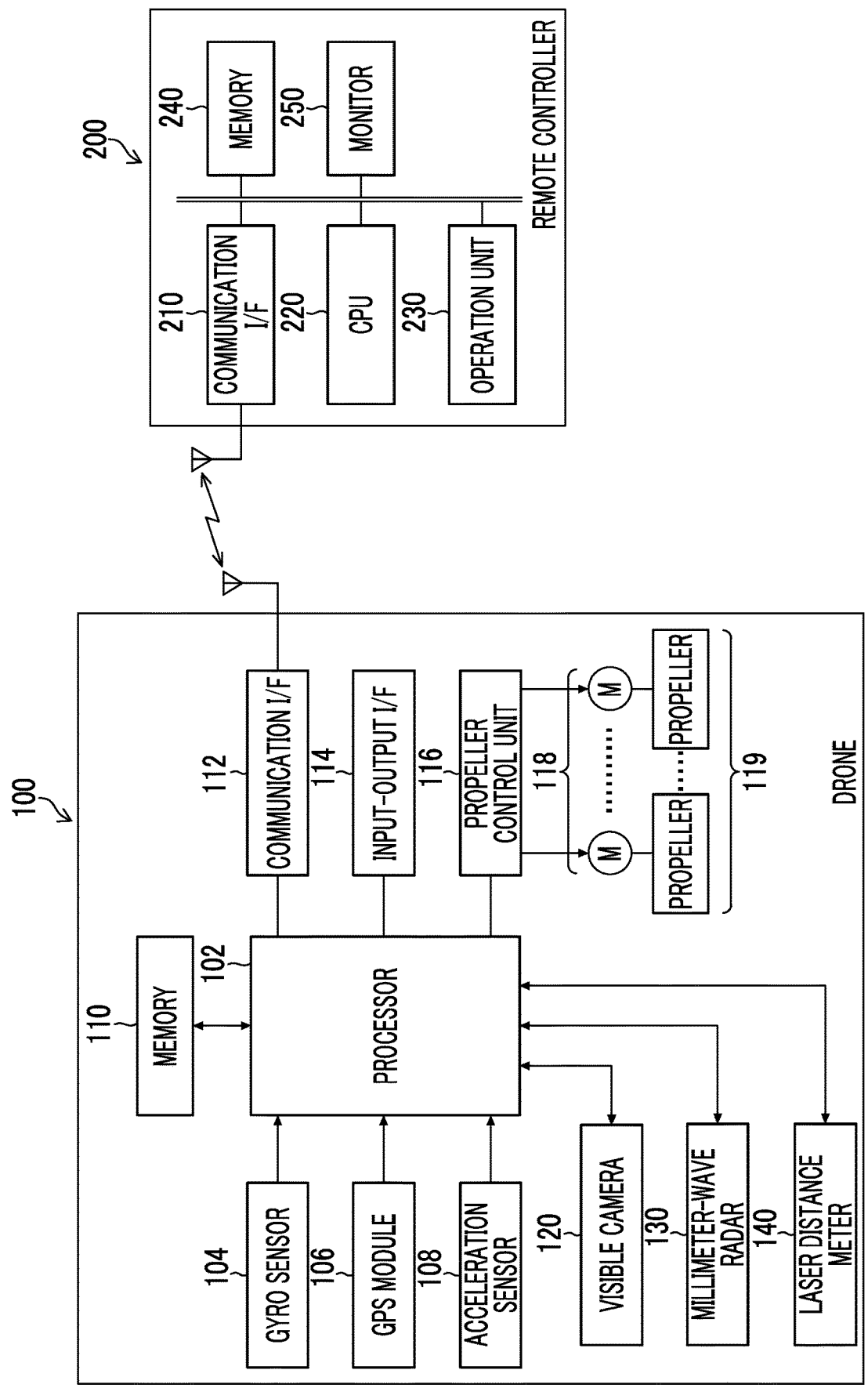
FIG. 11 is a block diagram showing an embodiment of a hardware configuration of the flight imaging system according to the present invention.

FIG. 11 is a block diagram showing an embodiment of a hardware configuration of the flight imaging system according to the present invention.

The drone 100 shown in FIG. 11 corresponds to the third embodiment shown in FIGS. 9 and 10, and includes a processor 102, a gyro sensor 104, a GPS module 106, an acceleration sensor 108, a memory 110, and a communication interface (communication I/F) 112, an input-output I/F 114, a plurality of propellers 119, a plurality of motors 118 for driving each of the plurality of propellers 119, and a propeller control unit 116 for controlling the operation of the plurality of motors 118, a visible camera 120, a millimeter-wave radar 130, a laser distance meter 140, and the like.

The memory 110 includes a random access memory (RAM), a read only memory (ROM), a flash ROM, or the like, and an operating system, a program for executing a flight imaging method, flight plan information such as a flight route, the table shown in FIG. 5, or the like are stored in the ROM or the flash ROM. The RAM temporarily stores a program read out from the ROM or the flash ROM, and functions as a work area of the processor 102. In addition, the flash ROM can function as an internal memory that stores a visible image captured by the visible camera 120 and a millimeter-wave image captured by the millimeter-wave radar 130.

The processor 102 is a part that reads various programs from the memory 110 and controls each part in an integrated manner. The processor 102 performs flight control of the drone 100, control of capturing a visible image by the visible camera 120, control of capturing a millimeter-wave image and the measurement of the altitude with the millimeter-wave radar 130, and the measurement of the altitude with the laser distance meter 140.

Further, each output signal of the gyro sensor 104, the GPS module 106, and the acceleration sensor 108 is input to the processor 102. The processor 102 can know the posture, the angular velocity, and the angular acceleration of the drone 100 based on the output signal of the gyro sensor 104. In addition, the processor 102 can know the position (latitude, longitude, altitude) of the drone 100 based on the GPS signal of the GPS module 106. Furthermore, the processor 102 can know the acceleration of the drone 100 based on the output signal of the acceleration sensor 108.

The processor 102 executes various operations of autonomous flight such as takeoff, moving flight, hovering, revolution, and landing of the drone 100 according to a flight route set in advance by the flight plan, or semi-autonomous flight in which the drone 100 receives an instruction about a part of flight from the remote controller 200 and flies in response to the instruction by controlling each of the plurality of motors 118 via the propeller control unit 116 based on the output signals of the gyro sensor 104, the GPS module 106, and the acceleration sensor 108.

Obviously, the drone 100 can arbitrarily fly based on a flight instruction from the remote controller 200, in addition to the autonomous flight or the semi-autonomous flight. In addition, at the time of hovering, it is possible to automatically control to hold the position and the posture of the drone 100 based on the detection output of the gyro sensor 104 or the acceleration sensor 108. Furthermore, the gyro sensor 104 can detect the angular velocity along the movement of the drone 100 and can detect the angle by the integral calculation of the angular velocity, and the acceleration sensor 108 can detect the tilt (direction of gravitational force) of the drone 100, the parallel translation, and the speed by the integral.

The processor 102 performs processing of capturing a visible image of the surface layer of the structure by the visible camera 120 and processing of transmitting the millimeter wave toward the structure from the millimeter-wave radar 130 and receiving the reflected wave of the millimeter wave from the structure to capture a millimeter-wave image. The processor 102, during the moving flight of the drone 100, causes the millimeter-wave radar 130 to measure the altitude from the reference surface by and causes the laser distance meter 140 to measure the altitude from the reference surface at the time of stationary flight of the drone 100. The altitude information indicating these altitudes is used for flight control of the drone 100.

The drone 100 uses information of the altitude and the distance to the structure measured by the millimeter-wave radar 130 and the laser distance meter 140 to perform autonomous flight or semi-autonomous flight in an environment in which GPS radio waves do not reach.

The drone 100 can fly while keeping a constant distance (altitude) from the reference surface measured by the millimeter-wave radar 130 or the laser distance meter 140 and the distance to the structure 10. The altitude at which the drone 100 should fly and the distance to the structure 10 can be acquired from the memory 110 as flight plan information such as a flight route, or can be received from the remote controller 200 by a user instruction.

In addition, since the specific control of the drone 100 at the time of flight and at the time of imaging by the processor 102 is the same as that of the third embodiment described with reference to FIGS. 9 and 10, the description thereof will be omitted here.

The remote controller 200 is used to remotely control the drone 100 by a user operation, and includes a communication I/F 210, a central processing unit (CPU) 220, an operation unit 230, a memory 240, and a monitor 250.

The CPU 220 integrally controls each unit by executing the firmware stored in the memory 240. The processor 102 of the drone 100 and the CPU 220 of the remote controller 200 can exchange necessary information via the communication I/Fs 112 and 210, and the remote controller 200 receives a live view image captured by the visible camera 120 via the communication I/Fs 112 and 210 and can display it on the monitor 250.

The user can operate the operation unit 230 while viewing the live view image displayed on the monitor 250 to guide the drone 100 to fly to the first imaging point of the structure 10. In a case where the flight route to the first imaging point is in an environment capable of receiving the GPS radio wave, by setting the flight route to the drone 100 in advance, the drone 100 can fly autonomously to the first imaging point while capturing the current position with the GPS module 106. In this case, the user gives an instruction for autonomous flight to the first imaging point from the remote controller 200 to the drone 100.

In a case where the drone 100 reaches the first imaging point, the user gives an instruction from the remote controller 200 to execute the flight imaging method according to the present invention to the drone 100. As a result, the drone 100 acquires information such as an altitude measured by the millimeter-wave radar 130 and the laser distance meter 140, a distance to the structure 10, and the drone 100 moves each imaging point while maintaining a preset altitude and the distance to the structure 10. Then, the drone 100 is stationary at each imaging point to capture a visible image by the visible camera 120 and capture a millimeter-wave image by the millimeter-wave radar 130.

The capturing of the visible image by the visible camera 120 and the capturing of the millimeter-wave image by the millimeter-wave radar 130 at each imaging point may be automatically performed at a time when the hovering of the drone 100 at each imaging point is stable or may be performed by receiving the imaging instruction from the remote controller 200 by the user operation.

The drone 100 moves to the next imaging point after the imaging at a certain imaging point is completed. The distance between the imaging points can be preset based on the imaging area on the structure 10 corresponding to the visible image to be captured. For example, it is preferable that the distance between the imaging points is set to be shorter than the length of the long side of the imaging area in a case where the drone 100 is moved in the horizontal direction, and the distance is set to be shorter than the length of the short side of the imaging area in a case where the drone 100 is moved in the vertical direction. This is because, in a case of panorama composition of captured visible images, overlapping image areas between adjacent visible images are required.

Since the moving distance of the drone 100 can be estimated based on the detection output of the acceleration sensor 108, the drone 100 can be stopped at a position where the moving distance of the drone 100 from a certain imaging point reaches a preset distance as the next imaging point. In addition, in a case where the speed pattern from the certain imaging point to the next imaging point is determined, the flight time can be controlled to move the drone 100 to the next imaging point.

After the imaging at the last imaging point is completed by the drone 100, the user can operate the operation unit 230 while viewing the live view image displayed on the monitor 250 to return the drone 100. In addition, in an environment in which the GPS radio wave can be received, the user can automatically return the drone 100 by instructing the return from the remote controller 200.

Figure 12:
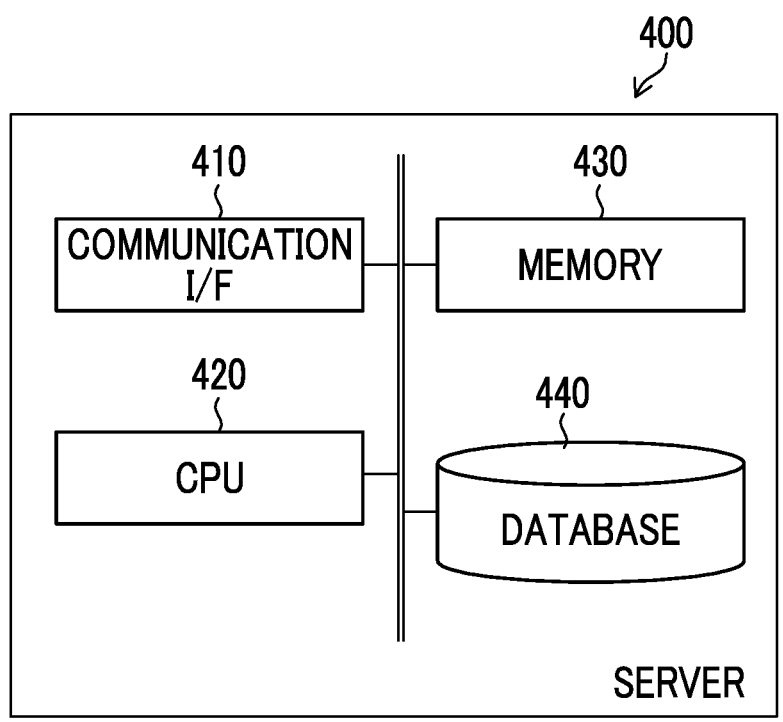
FIG. 12 is a block diagram showing an embodiment of a server applied to the flight imaging system according to the present invention.

FIG. 12 is a block diagram showing an embodiment of a server applied to the flight imaging system according to the present invention.

The server 400 shown in FIG. 12 processes a visible image and a millimeter-wave image uploaded from the user terminal 300 or collected from the user terminal 300, and returns the processing result to the user terminal 300. The server 400 includes a communication I/F 410, a CPU 420, a memory 430, and database 440.

The CPU 220 controls each part in an integrated manner by executing a program stored in the memory 240, and performs processing of detecting damage appearing on the surface layer of the structure 10 based on a visible image as described later, processing of generating a millimeter-wave image inside the structure from millimeter-wave reception data including three-dimensional information up to a predetermined depth from the surface layer of the structure, and processing of combining the visible image and the millimeter-wave image.

The database 440 stores and manages the visible image and the millimeter-wave reception data acquired from the user terminal 300 via the communication I/F 410, and the processing result for the visible image and the millimeter-wave reception data.

Figure 13:
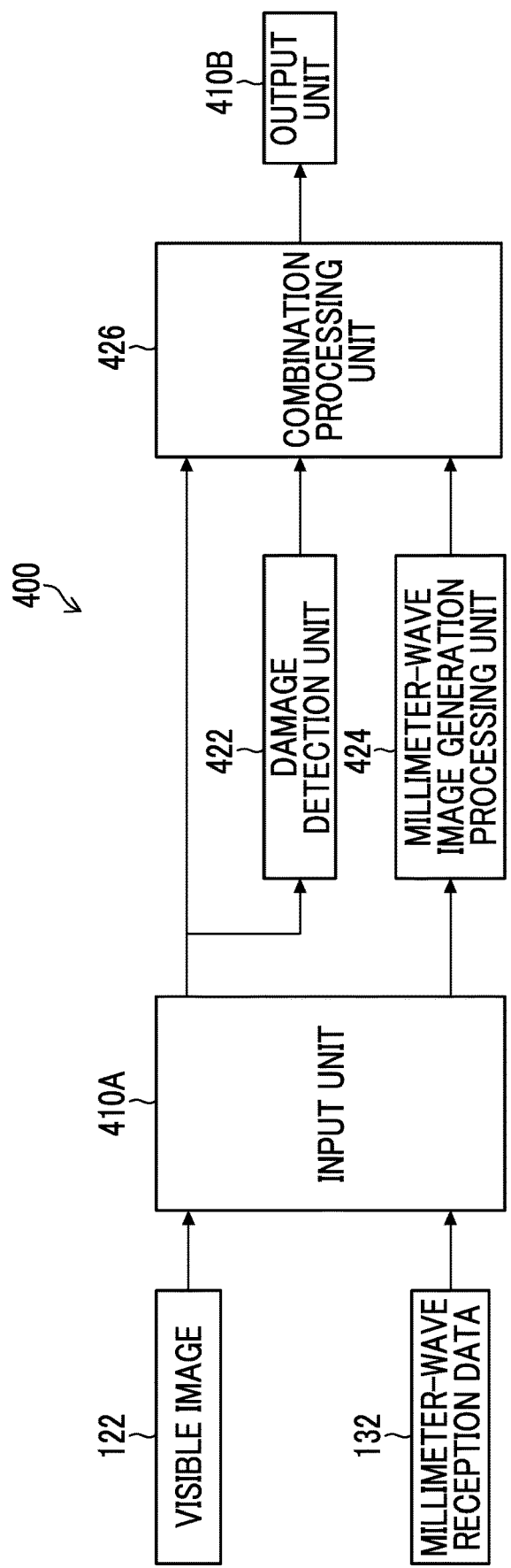
FIG. 13 is a functional block diagram showing functions of the server shown in FIG. 12.

FIG. 13 is a functional block diagram showing functions of the server shown in FIG. 12.

The server 400 shown in FIG. 13 mainly includes an input unit 410A, a damage detection unit 422, a millimeter-wave image generation processing unit 424, a combination processing unit 426, and an output unit 410B.

The input unit 410A acquires the visible image 122 and the millimeter-wave reception data 132 from the user terminal 300. The input unit 410A corresponds to the communication I/F 410 of the server 400 that receives the visible image 122 and the millimeter-wave reception data 132 transmitted from the user terminal 300.

The damage detection unit 422 performs processing of detecting damage (for example, fissuring, free lime, exposed reinforcing bar, peeling of concrete) appearing on the surface layer of the structure 10 based on the visible image 122, specifies a damage area and a damage type, and outputs the damage image.

The damage detection unit 422 may be performed by an image processing algorithm or may be performed by artificial intelligence (AI). For example, a trained model using a convolution neural network (CNN) can be used as AI.

The millimeter-wave image generation processing unit 424 generates a millimeter-wave image showing the inside of the structure based on the millimeter-wave reception data 132 indicating the reflected wave of the millimeter wave from the structure. As shown in FIG. 6, the reflected wave of the millimeter wave includes a reflected wave from the surface of the structure and a reflected wave from an internal defect of the structure, and the former reflected wave has a higher reflection intensity than the latter reflected wave. It is preferable that the millimeter-wave image generation processing unit 424 extracts millimeter-wave reception data indicating a reflected wave other than the reflected wave from the surface of the structure, and generates a millimeter-wave image based on the extracted millimeter-wave reception data. In addition, it is preferable that the millimeter-wave image has a color different from that of the visible image such as red, and is represented by a shade according to the depth and the reflection intensity so that the millimeter-wave image can be distinguished from the visible image of the surface layer of the structure 10.

The combination processing unit 426 combines the visible image, the damage image output from the damage detection unit 422, and the millimeter-wave image output from the millimeter-wave image generation processing unit 424. Since the positional relationship between the visible image and the millimeter-wave image can be specified based on the table shown in FIG. 6, the millimeter-wave image can be combined with the visible image.

In this example, the visible image, the damage image, and the millimeter-wave image are combined, but the present invention is not limited to this. The visible image and the millimeter-wave image may be combined, or the damage image and the millimeter-wave image may be combined. In addition, the server 400 can also perform panorama composition of the visible image or the like.

The damage detection unit 422, the millimeter-wave image generation processing unit 424, and the combination processing unit 426 correspond to each function of the CPU 420 of the server 400.

The combined image combined by the combination processing unit 426 is transmitted to the user terminal 300 via the output unit 410B. The input unit 410A corresponds to the communication I/F 410 of the server 400.

As a result, the user can confirm the internal defects in addition to the damage of the surface layer of the structure.

The user terminal 300 may be configured to have the processing function of the server 400 of this example.

[Flight Imaging Method]

Figure 14:
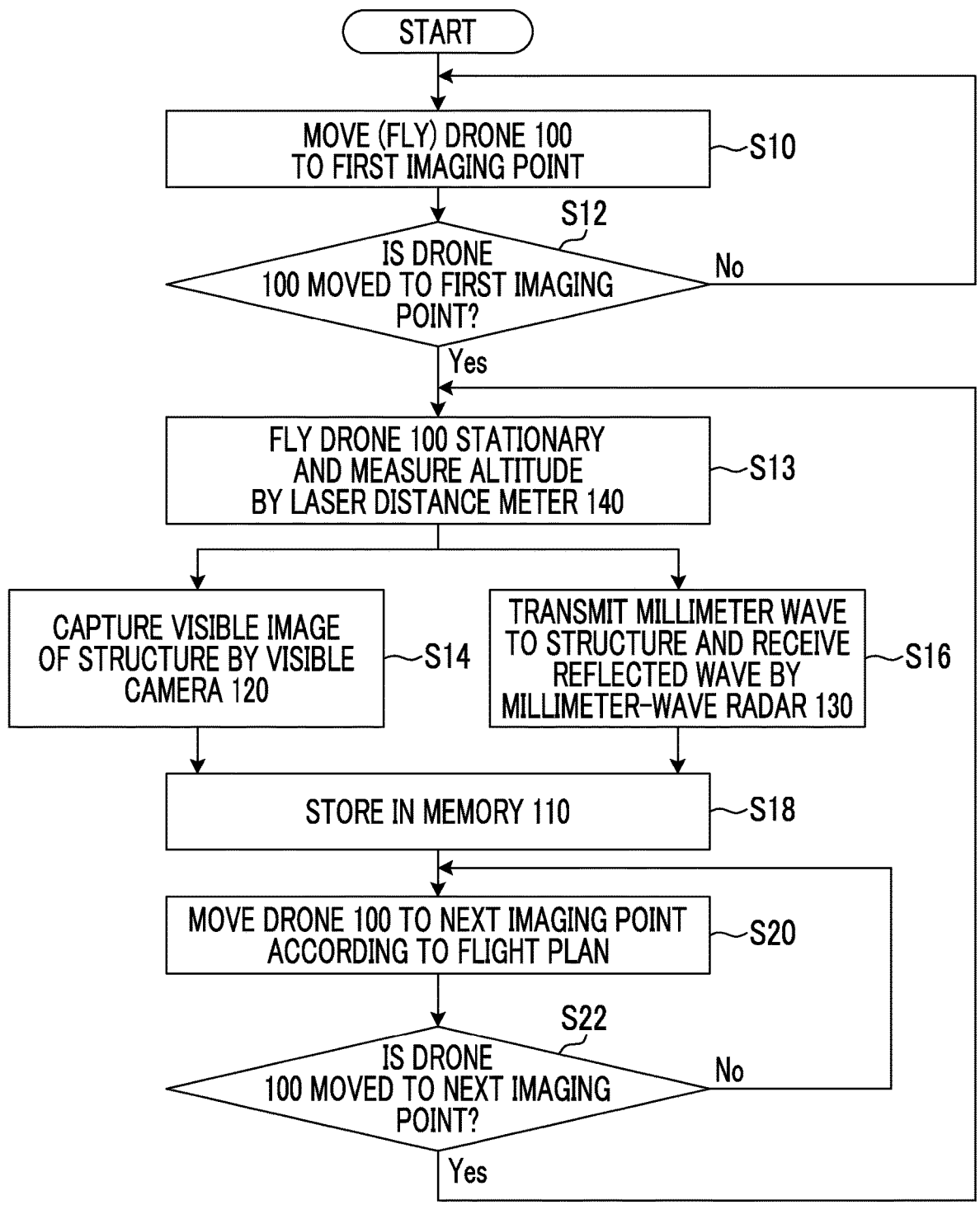
FIG. 14 is a flowchart showing an embodiment of a flight imaging method according to the present invention.

FIG. 14 is a flowchart showing an embodiment of a flight imaging method according to the present invention.

The processing of each step shown in FIG. 14 is performed by, for example, the processor 102 of the drone 100 shown in FIG. 11.

In FIG. 13, the drone 100 is moved (flied) to the first imaging point where imaging of the structure is performed (step S10). The flight of the drone 100 may be performed by autonomous flight of the drone 100 according to a flight plan, or may be performed by an instruction from the remote controller 200 operated by the user.

The processor 102 determines whether or not the drone 100 is moved to the first imaging point (step S12). In a case where determination is made that the drone 100 is moved to the first imaging point (in the case of "Yes"), the processor 102 causes the drone 100 to fly stationary at the imaging point, and causes the laser distance meter 140 to measure the distance (altitude) of the drone 100 from the reference surface (step S13).

Subsequently, the processor 102 causes the visible camera 120 to capture the visible image of the structure (step S14), and causes the millimeter-wave radar 130 to capture the millimeter-wave image of the structure (step S16). The capturing of the millimeter-wave image is performed by transmitting the millimeter wave to the structure, receiving the reflected wave from the millimeter-wave area, and acquiring the millimeter-wave reception data.

The processor 102 stores the captured visible image and the millimeter-wave image in the memory 110 in association with each other (step S18).

After the imaging of the structure at the imaging point is completed, the processor 102 moves the drone 100 to the next imaging point according to the flight plan (step S20).

In a case where determination is made that the drone 100 is moved to the next imaging point (in a case of "Yes"), the processor 102 transitions to step S13. Here, a stationary flight is performed at the imaging point, and the altitude of the drone 100 is measured by the laser distance meter 140.

The processor 102 repeats the processing from step S13 to step S22 until the imaging at all the imaging points is completed.

[Others]

The processor of the unmanned flying object of the flight imaging system according to the present invention and the various processors of the server include a central processing unit (CPU) that is a general-purpose processor functioning as various processing units by executing programs, a programmable logic device (PLD) that is a processor of which circuit configuration can be changed after manufacture, such as a field programmable gate array (FPGA), a dedicated electrical circuit that is a processor having circuit configuration designed exclusively to perform specific processing, such as an application specific integrated circuit (ASIC), and the like. One processing unit constituting the flight imaging system may be composed of one of the various processors or two or more processors of the same type or different types. For example, one processing unit may be composed of a plurality of FPGAs or a combination of a CPU and an FPGA. In addition, a plurality of processing units may be composed of one processor. As an example of configuring the plurality of processing units with one processor, first, as represented by a computer such as a client or a server, a form of configuring one processor with a combination of one or more CPUs and software and causing the processor to function as the plurality of processing units is present. Secondly, as represented by system on chip (SoC) or the like, there is a form in which a processor that realizes all functions of a system including a plurality of processing units into one integrated circuit (IC) chip is used. Accordingly, various processing units are configured using one or more of the various processors as a hardware structure. Furthermore, the hardware structure of those various processors is more specifically an electric circuit (circuitry) in which circuit elements such as semiconductor elements are combined.

In addition, the present invention is not limited to the embodiment and can be subjected to various modifications without departing from a spirit of the present invention.

EXPLANATION OF REFERENCES

1: flight imaging system
10: structure
12: internal defect
20, 20A, 20B: reference surface
100: drone
102: processor
104: gyro sensor 106: GPS module
108: acceleration sensor
110: memory
112: communication I/F
114: input-output I/F
116: propeller control unit
118: motor
119: propeller
120: visible camera
122: visible image
124: visible image area
130, 131: millimeter-wave radar
132: millimeter-wave reception data
134: millimeter-wave area
140: laser distance meter
150: memory card
200: remote controller
210: communication I/F
220: CPU
230: operation unit
240: memory
250: monitor
300: user terminal
400: server
410: communication I/F
410A: input unit
410B: output unit
420: CPU
422: damage detection unit
424: millimeter-wave image generation processing unit
426: combination processing unit
430: memory
440: database
S10 to S22: step

What is claimed is:

1. A flight imaging system comprising:
a visible camera that captures a visible image;
a first millimeter-wave radar;
a laser distance meter;
a reference surface detecting unit that detects whether or not a reference surface is difficult to detect with the laser distance meter;
an unmanned flying object on which the visible camera, the first millimeter-wave radar, the laser distance meter and the reference surface detecting unit are mounted; and
a processor that controls the visible camera, the first millimeter-wave radar, the laser distance meter, the reference surface detecting unit and the unmanned flying object,
wherein the processor is configured to
control the visible camera to capture a visible image of a surface layer of a structure by the visible camera, and control the first millimeter-wave radar to transmit a millimeter wave toward the structure from the first millimeter-wave radar and receive a reflected wave of the millimeter wave from the structure, in a case of imaging the structure, and
cause, during flight of the unmanned flying object, the laser distance meter to measure:
an altitude of the unmanned flying object from the reference surface to acquire altitude information indicating the measured altitude, in a case where the reference surface detecting unit detects that the reference surface is not difficult to detect with the laser distance meter; and
an altitude of the unmanned flying object from a new reference surface which is capable of being detected by the laser distance meter and is newly set as the reference surface, to acquire altitude information indicating the measured altitude, in a case where the reference surface detecting unit detects that the reference surface is difficult to detect with the laser distance meter, and
wherein the altitude information is used in a case of flying the unmanned flying object.

2. The flight imaging system according to claim 1, wherein the laser distance meter further measures a distance from the unmanned flying object to the structure.

3. The flight imaging system according to claim 1, wherein the reference surface that is difficult to detect is a water surface.

4. The flight imaging system according to claim 1, wherein the new reference surface is a ground existing in a direction except for a vertical downward direction of the unmanned flying object.

5. The flight imaging system according to claim 1, wherein the reference surface detecting unit is a second millimeter-wave radar.

6. The flight imaging system according to claim 5, wherein the first millimeter-wave radar is also used as the second millimeter-wave radar, and
the processor directs the first millimeter-wave radar toward the structure in a case of imaging the structure, and directs the first millimeter-wave radar downward during the flight of the unmanned flying object.

7. The flight imaging system according to claim 1, wherein in a case of imaging the structure, the processor performs millimeter-wave image generation processing of generating a millimeter-wave image showing an inside of the structure based on the reflected wave of the millimeter wave from the structure received by the first millimeter-wave radar.

8. The flight imaging system according to claim 7, further comprising:
a memory that stores a relationship between a first imaging range of the visible image of the surface layer of the structure captured by the visible camera and a second imaging range of the generated millimeter-wave image,
wherein the processor performs combination processing of combining the millimeter-wave image with the visible image based on the relationship between the first imaging range and the second imaging range stored in the memory.

9. The flight imaging system according to claim 7, wherein the structure is a concrete structure, and
the millimeter-wave image is an image showing an internal defect of the concrete structure.

10. A flight imaging method of causing a processor to control imaging and flight by an unmanned flying object on which a visible camera that captures a visible image, a first millimeter-wave radar, a laser distance meter and a reference surface detecting unit that detects whether or not a reference surface is difficult to detect with the laser distance meter are mounted, the method comprising:
causing the visible camera to capture a visible image of a surface layer of a structure, and causing the first millimeter-wave radar to transmit a millimeter wave toward the structure from the first millimeter-wave radar and receive a reflected wave of the millimeter wave from the structure, in a case of imaging the structure; and causing, during flight of the unmanned flying object, the laser distance meter to measure:
an altitude of the unmanned flying object from the reference surface to acquire altitude information indicating the measured altitude, in a case where the reference surface detecting unit detects that the reference surface is not difficult to detect with the laser distance meter; and
an altitude of the unmanned flying object from a new reference surface which is capable of being detected by the laser distance meter and is newly set as the reference surface, to acquire altitude information indicating the measured altitude, in a case where the reference surface detecting unit detects that the reference surface is difficult to detect with the laser distance meter, and
wherein the altitude information is used in a case of flying the unmanned flying object.

* * * * *